United States Patent [19]
Scherf

[11] 4,209,387
[45] Jun. 24, 1980

[54] CONTOUR AND WIDTH GAUGE FOR PANELED CONTAINERS

[75] Inventor: Gerald F. Scherf, Holland, Ohio

[73] Assignee: Owens-Illinois, Inc., Toledo, Ohio

[21] Appl. No.: 953,057

[22] Filed: Oct. 19, 1978

[51] Int. Cl.$^2$ .............................................. B07C 5/00
[52] U.S. Cl. ................................... 209/530; 209/598
[58] Field of Search ............... 209/530, 531, 598, 600, 209/601, 604; 200/61.41

[56] References Cited

U.S. PATENT DOCUMENTS

| | | | |
|---|---|---|---|
| 2,881,918 | 4/1959 | Cunha | 209/598 X |
| 3,018,889 | 1/1962 | Fouse | 209/531 |
| 3,032,192 | 5/1962 | Uhlig | 209/598 X |
| 3,327,848 | 6/1967 | Barnhart et al. | 209/531 |

*Primary Examiner*—Allen N. Knowles
*Attorney, Agent, or Firm*—D. T. Innis; Myron E. Click; David H. Wilson

[57] ABSTRACT

Method and apparatus for detecting bulged and sunken sidewalls and incorrect widths on paneled containers.

Containers to be inspected are moved along a conveyor. Two groups of three LVDT's (generally opposite from one another) are utilized to measure the distance between each of three points on the container sidewall and a reference line. The measurements are fed to a circuit which determines the deviation of one of the three points from a line passing through the remaining two points. The amount of deviation is utilized to determine whether or not the sidewall is bulged or sunken. Measurements from each pair of opposing LVDT's are fed to a circuit which determines the width of the container at three different heights. The width values are compared to predetermined limits in order to determine if the container width is acceptable.

The timing of measurements is controlled by the use of photocell sensors, which detect the passage of a container past particular reference points. The positions of the sensors are adjustable in order to permit different types or sizes of containers to be inspected. In addition, a sensor can be employed to permit accurate width measurements to be made on container with bowed panels.

21 Claims, 8 Drawing Figures

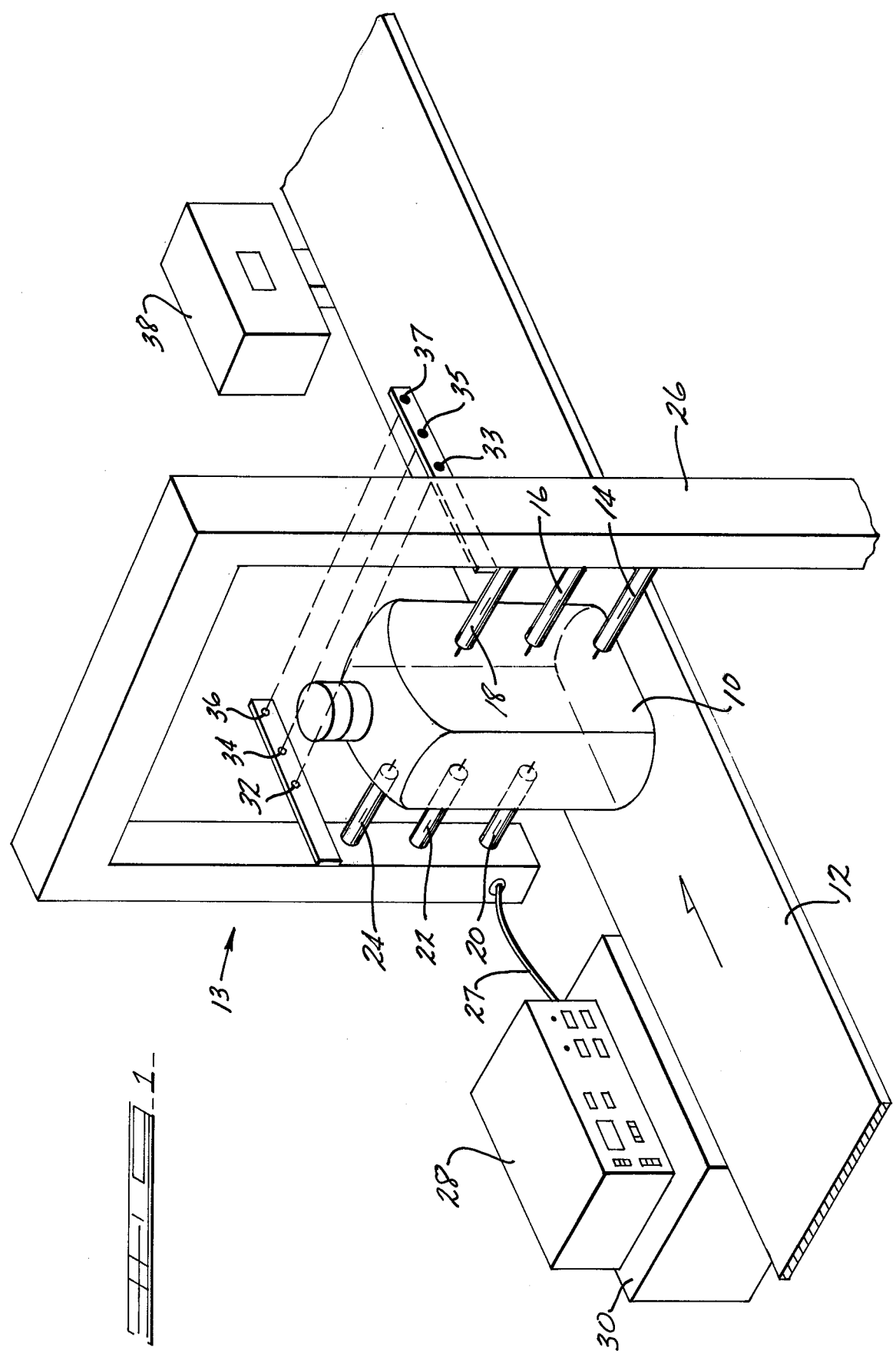

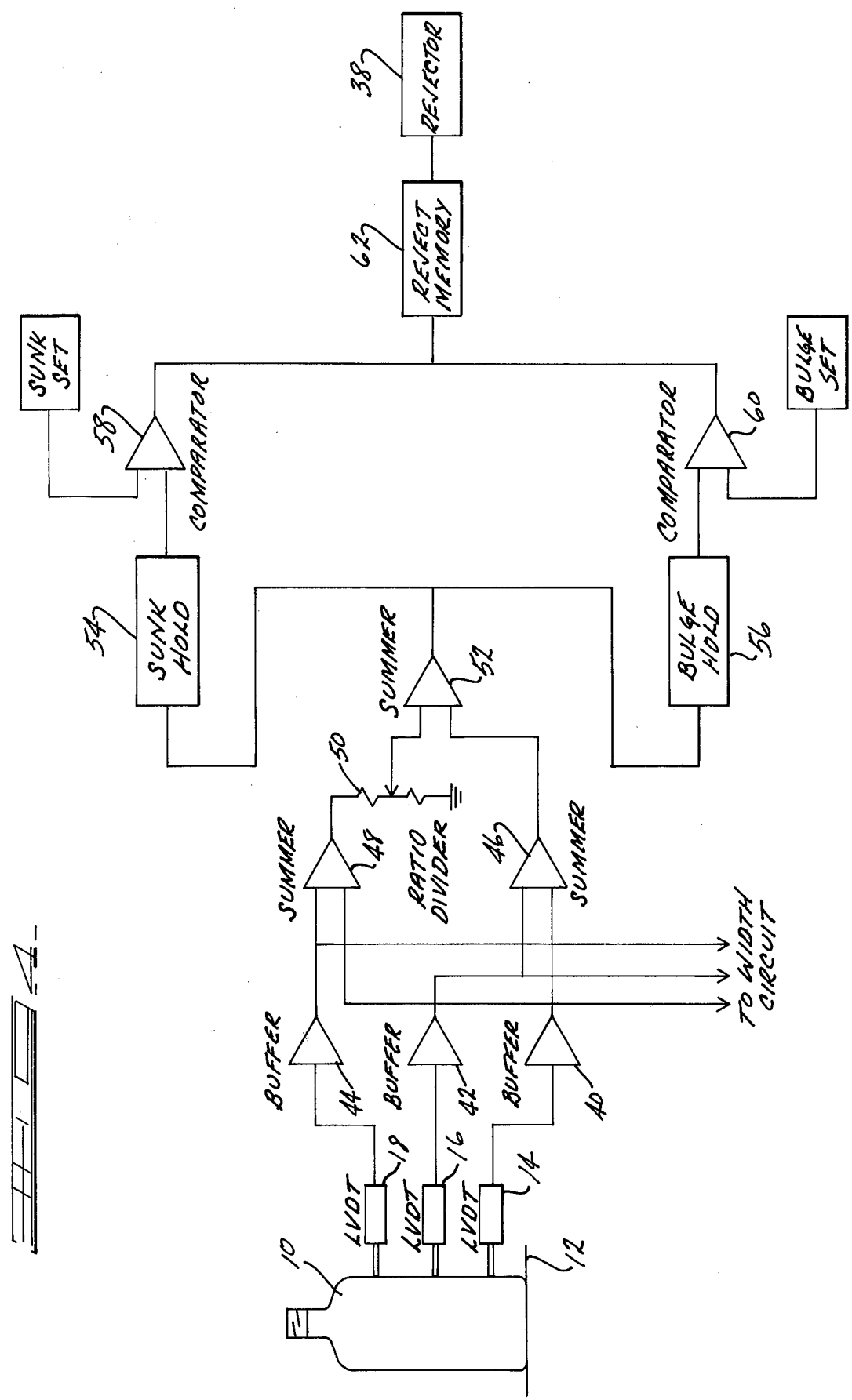

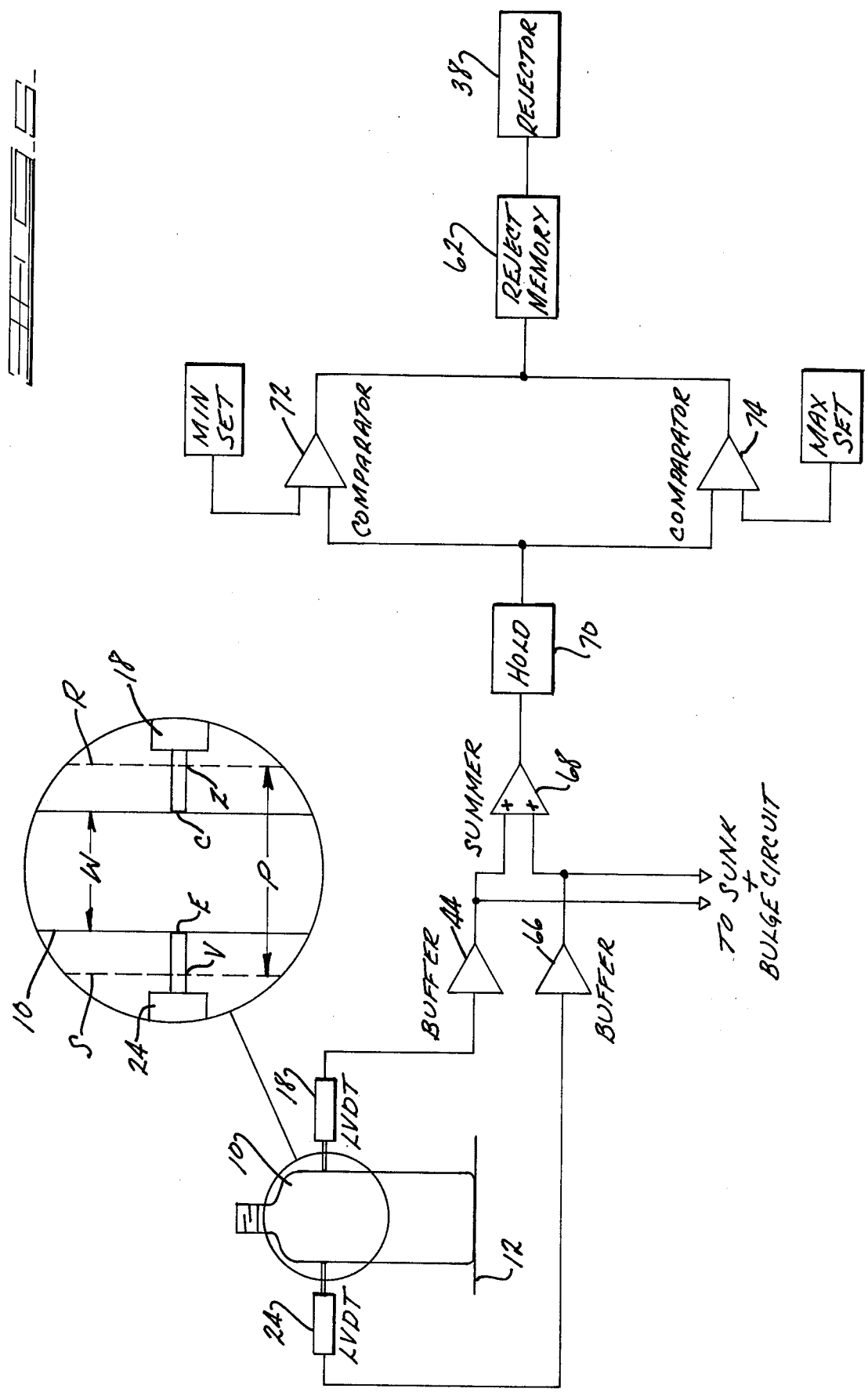

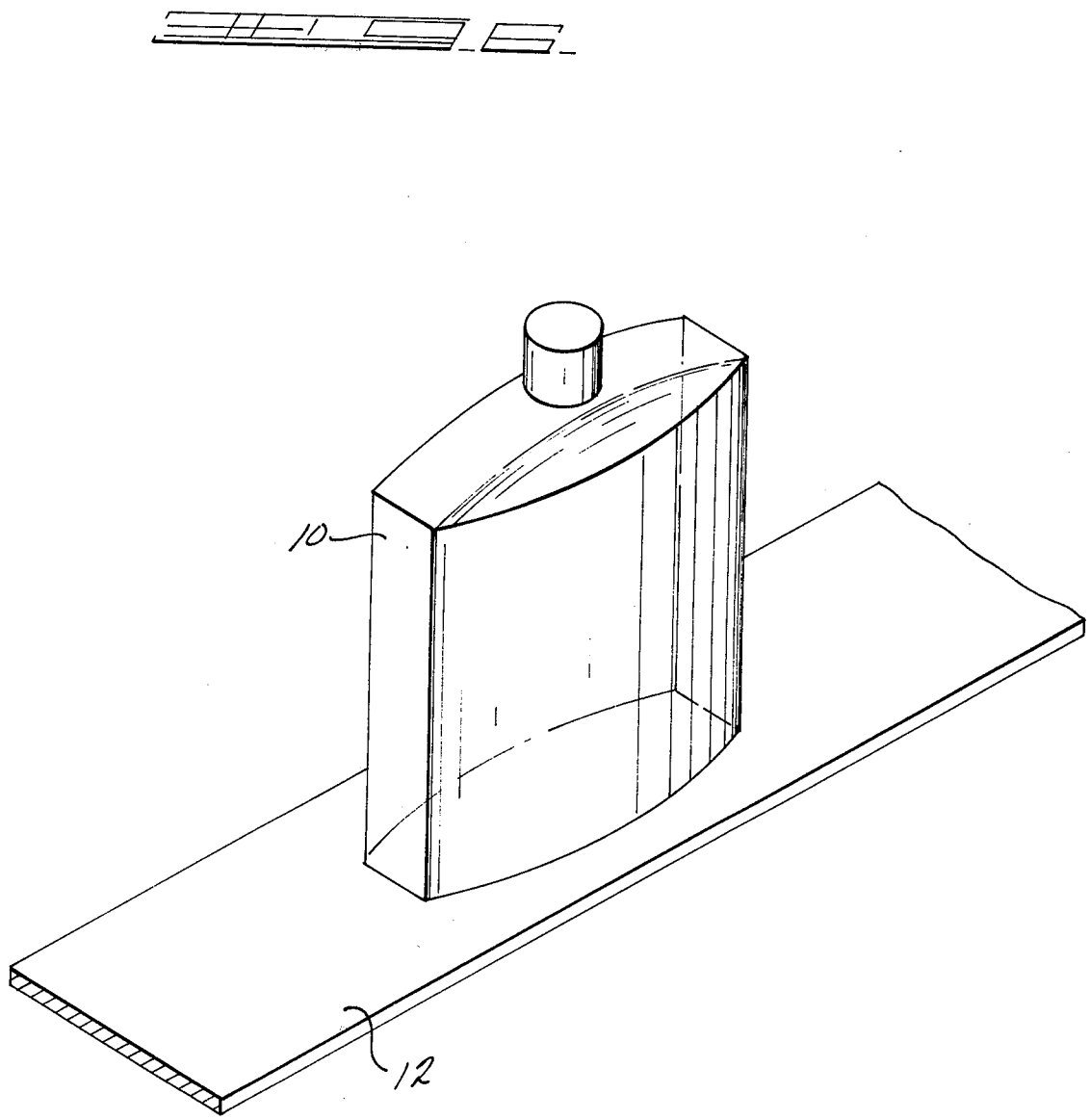

CONTOUR AND WIDTH GAUGE FOR PANELED CONTAINERS

BACKGROUND AND SUMMARY OF THE INVENTION

This invention relates to the inspection of paneled containers to determine whether or not the containers have bulged or sunken panels. More particularly, this invention relates to the inspection of paneled containers which are made of glass.

During the production of paneled glass containers, manufacturing inconsistencies sometimes result in containers being produced with bulged or sunken side panels. The defective side panels cause the container volume to be incorrect, and also make labeling of the container difficult. It is therefore helpful to provide some means for inspecting the panels on the containers in order to determine if they are defective. One such system is disclosed in U.S. Pat. No. 3,343,673, issued to C. H. Thacker et al. Described is a system for gauging flasks in which a pair of reference feelers contact the wall of a container above and below the portion of the container wall which would be bulged or sunken. A pair of gauging feelers contact the portion of the container wall which would be bulged or sunken if the container were defective. The reference feelers are utilized to define the desired paths of the gauging feelers. If the gauging feelers deviate from their desired paths, the container is considered defective and is automatically rejected.

In addition to the problem of bulged and sunken sidewalls, some containers are produced which have an incorrect width measurement. Systems for gauging this type of defect are disclosed in U.S. Pat. No. 3,344,245 issued to C. W. Kulig, and British Pat. No. 1,245,592, issued to E. Evers et al.

The Kulig patent describes a system in which a pair of rotatable, tangentially opposed gauging wheels, which have pockets conforming to the body shape of the containers, embrace the containers as they move along a conveyor. The containers fit into opposing pockets of the wheels as they move. Oversize containers cause the gauging wheels to be spread apart, which in turn activates a reject mechanism. The Evers patent provides a gating mechanism which allows the passage of containers whose width is less than a certain value. If a container is arrested by the gate, the gate is temporarily opened and the container passes through the gate. The defective container is rejected as it moves down the conveyor line.

Another system, shown in U.S. Pat. No. 3,249,223, describes a system which measures the diameter of containers having lug finishes by means of a differential transformer. If the diameter is either too large or too small, a reject signal is generated and the container is subsequently rejected.

The present invention provides a system which permits the detection of containers which have bulged or sunken side panels and/or incorrect width. In order to determine if a sidewall or panel exhibits a bulged or sunken condition, the distance between a reference line and three points on the container sidewall is measured from three spaced apart points along the reference line. These measurements are utilized to determine the extent of deviation of one of the points on the sidewall from a line passing through the other two points on the sidewall. If the sidewall is flat, all three points will lie on a line. Deviation of one of the points from a line passing through the other two thus can be used to determine if the sidewall is bulged or sunken.

By making distance measurements on opposing sides of a container, a bulged or sunken sidewall can be detected on either side. In addition, by making the measurement at corresponding heights on opposing sides of a container, a width determination can be made. The width of a container can than be compared to predetermined limits in order to determine whether or not the container is defective.

In the preferred embodiment of the invention, LVDT's are utilized to make the distance measurements. Electronic circuits process the measurements to determine if a container has a bulged or sunken sidewall or an incorrect width. If the container is defective, it is automatically rejected as it moves along the conveyor.

BRIEF DESCRIPTION OF THE DRAWINGS

In the drawings:

FIG. 1 shows a container moving along a conveyor and in position to be inspected for defects by the system of the present invention;

FIG. 4 is a partial schematic, partial block diagram of the bulge and sunk detector circuit of the present invention;

FIG. 5 is a partial schematic, partial block diagram of the body width gauging circuit of the present invention; and FIG. 6 shows a container having bowed sidewalls.

DESCRIPTION OF THE PREFERRED EMBODIMENT

Figure 2A:
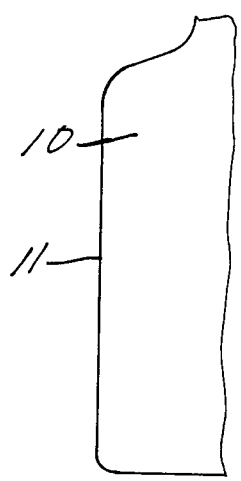
FIGS. 2A, B and C are schematic, vertical sectional views of a container half, illustrating three container sidewall conditions.

Referring to FIG. 1, a bottle 10 is shown positioned upright on moving a conveyor 12. The bottle 10 is of a type which has paneled sidewalls. The paneled sidewalls are oriented so that they are generally parallel to the direction of the movement of the bottle 10. As the bottle 10 moves along the conveyor 12 it passes an inspection station 13, where its opposing sidewalls are contacted by two groups of three LVDT's 14 and 16, 18 and 20 and 22 and 24 respectively. The LVDT's 14, 16, 18, 20, 22 and 24 are connected to a supporting frame 26, and are aligned such that the LVDT 18 is generally opposite the LVDT 24, the LVDT 16 is generally opposite the LVDT 22, and LVDT 14 is generally opposite the LVDT 20. The outputs of the LVDT's 14, 16, 18, 20, 22 and 24 are connected via a cable 27 to a control center 28. The control center 28 is supported on a platform 30 which is located next to the conveyor 12. The LVDT's 14, 16, 18, 20, 22 and 24 are conventional in the art and include feelers which contact the sidewalls of the bottle 10. The feelers will follow the contour of the bottle 10 as it moves along the conveyor 12, and the output of each of the LVDT's 14, 16, 18, 20, 22 and 24 is a function of the degree of extension of the feelers. That is, the output voltage of each LVDT is proportional to the distance between the point on the bottle 10 which is contacted by the feeler of the LVDT and a reference point on the longitudinal axis of the LVDT.

Located on a support bar 31, which is connected to the frame 26, is a group of three photocells 32, 34 and 36. Three light sources 33, 35 and 37 are attached to a second support bar 39, which is located on the opposite side of the conveyor 12 from the support bar 31. Beams generated by the three light sources 33, 35 and 37 are directed to strike the photocells 32, 34, and 36 respectively. As the bottle 10 advances along the conveyor 12 it initially breaks the beam generated by the light source 33. This turns off the photocell 32, which marks the beginning of a measuring sequence. When the beam generated by the light source 35 is broken by the bottle 10, the photocell 34 turns off, signifying that the center line of the bottle 10 is in a position to be measured. Since some bottles may bow out in the center (i.e. they are designed to be generally flat in a vertical direction but not in a horizontal direction, as shown in FIG. 6) particular measurements are made only at the center or widest point of the bottle, as will be explained subsequently. The turning off of the photocell 34 initiates these center line measurements. When the bottle 10 breaks the beam generated by the light source 37, it is out of the measuring position and measurements cease to be taken. Signals from the photocells 32, 34 and 36 thus control the timing of various measurements which are taken as the bottle 10 passes through the inspection station 13. The output of the photocells 32, 34 and 36 are connected to the control center 28 via the cable 27. After the bottle 10 has passed the inspection station 13 it passes a reject mechanism 38, which is conventional in the art, which automatically removes the bottle 10 from the conveyor 12 if it is found to be defective. The activation of the reject mechanism 38 is delayed in order to allow the bottle 10 to get into position to be rejected.

Figure 2B:
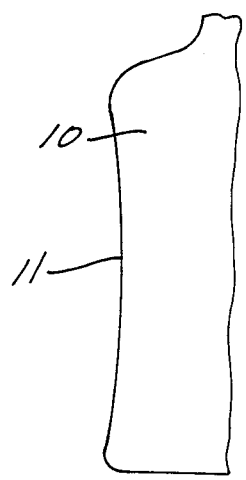
Figure 2C:
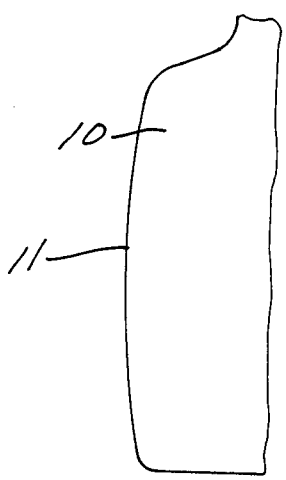

Referring now to FIGS. 2A, B and C, the bottle 10 is shown as having a flat sidewall 11 in FIG. 2A. If the bottle 10 is defective, the sidewall 11 will be either sunken, as shown in FIG. 2B, or bulged, as shown in FIG. 2C. The determination of whether or not the bottle 10 is defective will be described with reference to FIG. 3. A generally vertical line R serves as a reference for measurements which are made by the LVDT's 14, 16, and 18 (i.e. the outputs of the LVDT's are zero when their feelers are at the line R). The feelers of the LVDT's 14, 16, and 18 contact the bottle 10 at points a, b and c, respectively. The LVDT's 14, 16 and 18 intersect the line R at points x, y, and z respectively. The outputs of the LVDT's 14, 16 and 18 represent the distances xa, yb and zc, respectively. These measurements may be utilized to determine whether or not a bottle 10 is defective. A line from point a to point c passes through the line yb at a point d. If the sidewall 11 of the bottle 10 were flat, the points b and d would coincide. By determining the distance db, the variation of flatness of the sidewall 11 may be determined. By triangulation, the distance db may be calculated from the equation:

$$db = by - ax - (cz - ax)/M \quad (1)$$

where M=xz/xy. In the preferred embodiment of the invention, the position of the LVDT 16 is adjustable, and may be set to measure the bottle 10 at the most convenient location. The adjustment feature is particularly useful if different types of containers are to be inspected, since different types of containers may require a different location of the LVDT 16 for the most accurate inspection. If the distance db exceeds predetermined limits, the bottle 10 is unacceptable. Thus, the output of the LVDT's 14, 16 and 18 may be utilized to determine the distance of the point b from a line passing through the points a and c. Identical measurements are made on the opposite side of the bottle 10 by the LVDT's 20, 22 and 24, thus allowing the flatness of both sides of the bottle 10 to be determined.

Figure 3:
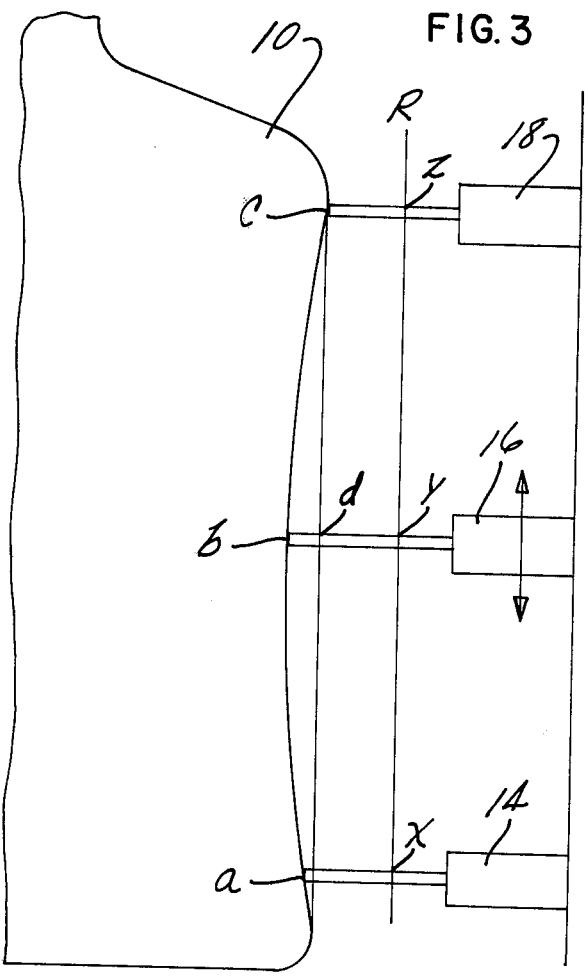
FIG. 3 is a schematic, side elevational view of the measuring apparatus of the present invention.

Referring further to FIG. 3, in the preferred embodiment of the invention, the LVDT's 14, 16 and 18 are adjusted so that they have a zero output when they contact an ideal container. Thus, if the points a and c on the container 10 are in the correct position, the reference line R will coincide with the line ac, and the output of the LVDT's 14 and 18 will be zero. In such a case, the distances cz and ax will be equal to zero, and the distance by will be equal to db.

Referring now to FIG. 4, a block diagram of the circuit which is utilized to determine whether or not a bottle has a bulged or sunken sidewall is shown. Two identical circuits are used (one for each side of the bottle 10), and therefore only one circuit is shown. The outputs of the three LVDT's 14, 16 and 18 are connected to the inputs of three buffer amplifiers 40, 42 and 44, respectively. The output of the buffer amp 40 is subtracted from the output of the buffer amp 42 by a summer 47. The output of the buffer amp 40 is subtracted from the output of the buffer amp 44 by a summer 48. The output of the summer 48 is passed through a ratio divider 50, the output of which is connected to a summer 52. The ratio divider 50 takes into account the value of the constant M from equation (1). The output of the summer 46 is subtracted from the output of the ratio divider 50 by the summer 52. It can be seen that the output of the ratio divider 52 thus represents the value of the distance db, and that the circuit determines the value of db according to equation (1). This value may be positive or negative depending whether the sidewall 11 of the bottle 10 is sunken or bulged. The highest and lowest values of the summer 52 are held by a sunk hold circuit 54 and a bulge hold circuit 56, respectively. The low and high values are compared to sunk and bulge set levels by two comparators 58 and 60, respectively. If either of the set levels is exceeded, one of the comparators 58 or 60 will generate a reject signal, which is fed to a reject memory 62. When the bottle 10 has moved down line a predetermined distance, the reject memory 62 causes the rejector 38 to automatically reject the bottle 10 from the conveyor 12.

In addition to being utilized to determine whether or not a bottle has a bulged or sunken sidewall, the LVDT's 16, 18, 20, 22 and 24 are utilized to determine whether or not a bottle is the proper width. Each opposing LVDT pair (14 and 20, 16 and 22, 18 and 24) is used to make a width measurement (i.e. three separate width measurements are made) as the bottle 10 passes the inspection station 13. As the circuit utilized for each LVDT pair is identical, only the circuit employing the outputs of the opposing LVDT's 18 and 24 will be discussed. With reference to FIG. 5, the output of the LVDT 18 is given with respect to the reference line R, and the output of the LVDT 24 is given with respect to a reference line S. The feelers of the LVDT's 18 and 24 contact the bottle 10 at points c and e respectively. The reference line R crosses the LVDT 18 at point z, and the reference line S crosses the LVDT 24 at a point v. The outputs of the LVDT's 18 and 24 thus represent the distances cz and ev, respectively. The distance between the reference lines R and S is a known value P. The actual width W of the bottle 10 under inspection is thus equal to $P-(cz+ev)$. If the width W of the bottle 10 is correct, the value of $cz+ev$ will equal a known value. For example, if the distance P is equal to six inches and the width W of a properly sized bottle 10 is equal to four inches, the sum of the distances cz and ev should equal two inches. Therefore, the outputs of the LVDT's 18 and 24 may be summed and the sum compared to limits in order to determine if it is near enough to the desired two inch value. In the preferred embodiment of the invention, the LVDT's 18 and 24 are set to have a zero output when they contact a correctly sized bottle, i.e. the distance P is equal to the distance W.

Referring further to FIG. 5, the output of the LVDT 18 is connected to the buffer 44, and the output of the LVDT 24 is connected to a buffer 66 (which is identical to the buffer 44). The output of each of the buffers 44 and 66 is fed to a summer 68, as well as to sunk and bulge circuit as described in FIG. 4. The output of the summer 68 represents the value $cz+ev$. A hold circuit 70, which is conventional in the art, holds the value of the maximum output of the summer 68. This value is then compared to an upper limit by a comparator 72 and to a lower limit by a comparator 74. The outputs of the comparators 72 and 74 are connected to the reject memory 62. If either of the limits is exceeded, one of the comparators 72 or 74 will generate a error signal which is stored by the reject memory 62. When the bottle 10 is in position adjacent to the rejector 38, the reject memory 62 causes the rejector 38 to reject the bottle 10.

Since the output of the summer 68 represents the distance between the feelers of the LVDT's 18 and 24, the bottle 10 need not be perfectly centered on the conveyor 12 in order to accurately inspect the bottle 10. The reason for this is that any additional extension of the feeler of the LVDT 18 is exactly compensated for by a corresponding depression of the feeler of the LVDT 24. Thus, the inspection system will function properly as long as the bottle 10 is located within the limits of movement of the feelers of the LVDT's.

If the style of bottle under inspection has a flat sidewall in both the vertical and horizontal directions (i.e. if it has a planar shape), the hold device 70 is not needed. In such a case, the width measurements may be made along the entire length of the bottle 10 as it passes the inspection station 18. However, if the bottle under inspection is a type in which a sidewall is flat in the vertical direction but not in a horizontal direction (i.e. the center of the bottle 10 is bowed out), as shown in FIG. 6, the width of the bottle 10 is not constant. The hold circuit 70 is utilized to hold the output of the summer 68 when it is at a maximum value, i.e. when the widest portion of the bottle 10 is being measured. In FIG. 6, this would correspond to the center of the bottle 10 as denoted by arrows 76 and 78. If the width of the bottle 10 at its widest point exceeds the limits of either of the comparators 72 or 74, the bottle 10 will then be rejected.

The photocell 34 of FIG. 1 controls the timing of the circuit of FIG. 5 to insure that the widest point on the bottle 10 has been measured before a comparison is made. If the widest point on the bottle 10 had not yet been measured, the bottle 10 might be improperly rejected for falling below the minimum limit of the comparator 72. The photocell 34 thus insures that no comparison is made until the output of the hold circuit 70 actually represents the width of the widest point on the bottle 10.

From the foregoing description, it is apparent that the output of each of the output of each of the LVDT's 14, 16, 18, 20, 22 and 24 is fed to a buffer, the output of which is in turn fed to two different circuits. One of the circuits determines whether or not the bottle 10 which is under inspection has a bulged or sunken sidewall. This test is performed on opposing sides of the bottle 10 by two identical circuits. A second type of circuit utilizes the outputs from the LVDT pairs 14 and 20, 16 and 22, and 18 and 24 in order to determine whether or not the bottle which in under inspection is the correct width. There are thus ten possible error conditions: either sidewall may be bulged, either sidewall may be sunken, the width as measured by the LVDT pair 14 and 20 may be incorrect, the width as measured by the LVDT pair 16 and 22 may be incorrect, or the width as measured by the LVDT pair 18 and 24 may be incorrect. If an error is determined to exist for any of these parameters, the reject memory 62 causes the rejector 38 to reject the bottle 10 as it moves down the conveyor 12.

In order to comply with the best mode requirement of the patent laws, the invention has been described in terms of detecting bulged and sunken sidewalls on paneled containers. The invention is not limited to this application, however. More broadly, the system may be utilized to inspect the contour of any paneled container, whether or not its sidewall is designed to be flat. This may be accomplished simply by changing the set limits of the comparators 58 and 60 of FIG. 4. For example, if the container under inspection is of a type which is normally somewhat "sunken" in the middle, the limits of the comparators 58 and 60 could be adjusted to reflect the normal condition. A reject signal would be generated if the container were either too sunken or not sunken enough, i.e. if the contour of the container were incorrect.

What is claimed is:

1. Apparatus for inspecting the contour of paneled containers, comprising:
    means for moving containers past an inspection station wherein paneled sidewalls of said containers are generally parallel to their direction of travel;
    measurement means, located at said inspection station for measuring the distance between a container panel and a generally vertical reference line from three spaced apart points located on said reference line as said container moves past said inspection station;
    said measurement means including an LVDT located at each of said measurement points, said LVDT's contacting said bottle as it moves past said inspection station; and
    detection means, connected to said measurement means, for determining whether or not said container has a predetermined contour.

2. The apparatus of claim 1 wherein the middle one of said three LVDT's is adjustable with respect to the other two of said three LVDT's.

3. The apparatus of claim 2 wherein said detection means includes means for determining the distance between the point where the middle of said three LVDT's contacts said container and a line passing through the points where the outside two of said three LVDT's contact said container.

4. The apparatus of claim 1 or 3 wherein said containers are glass bottles.

5. The apparatus of claim 4 wherein said container panels are generally flat along their height.

6. Apparatus for inspecting the contour of paneled containers, comprising:
   means for moving containers past an inspection station wherein paneled sidewalls of said containers are generally parallel to their direction of travel;
   measurement means, located at said inspection station, for measuring the distance between a container panel and a generally vertical reference line from three spaced apart points located on said reference line as said container moves past said inspection station;
   detection means, connected to said measurement means, for determining whether or not said container has a predetermined contour; and
   means for measuring two opposing panels of a container to determine whether or not the contour of either of said opposing panels corresponds to said predetermined contour.

7. The apparatus of claim 6 further including means for determining the width of said container and means for comparing said width to a predetermined value.

8. The apparatus of claim 7 further including means connected to said detection means, for rejecting containers which have an incorrect contour, an incorrect width, or combination thereof.

9. The apparatus of claim 8 wherein opposing panels of said containers are bowed and further including means for determining whether or not the width of a container is incorrect at its widest point.

10. The apparatus of claim 1, 8 or 9 further including sensing means for sensing when a container is in position to be measured.

11. The apparatus of claim 10 wherein said sensing means includes a plurality of photocell sensors.

12. A method for inspecting the contour of paneled upright containers comprising the steps of:
   moving a container past an inspection station;
   locating three vertically spaced apart points along the height of a panel of said container;
   calculating the distance between one of said three points and a line passing through the other two of said three points; and
   comparing said calculated distance to preset limits in order to determine whether or not the contour of said container corresponds to a predetermined contour.

13. A method for inspecting the contour of paneled containers, comprising the steps of:
   moving a container past an inspection station;
   measuring the distances between a reference line and three spaced apart points located along the height of a sidewall of said container;
   calculating the distance between one of said three points and a line passing through the other two of said points; and
   determining, as a function of said distance measurements, whether or not the contour of said container panel corresponds to a predetermined contour.

14. The method of claim 13 further including the steps of:
   comparing said calculated distance to predetermined limits; and
   automatically rejecting said containers if said calculated distance exceeds said limits.

15. The method of claim 14 including the step of inspecting the contour of opposing panels of said containers.

16. The method of claim 15 further including the step of determining the width of said container.

17. The method of claim 16 further including the steps of:
   comparing the width of said container to predetermined width limits; and
   rejecting said container if its width does not fall within said width limits.

18. Apparatus for inspecting the width of containers comprising:
   conveyor means for moving containers past an inspection station;
   first measurement means for determining the distance between a first reference point and a container;
   second measurement means for determining the distance between a second reference point and said container, wherein said second reference point is located directly opposite said container from said first reference point and is a known distance from said first reference point;
   summing means for determining, as a function of said distance measurements and said known distance, the width of said container as it moves past said inspection station; and
   means for comparing the width of said container with predetermined limits.

19. The apparatus of claim 18 further including means for rejecting containers whose width does not fall within said predetermined limits.

20. The apparatus of claim 18 further including means for determining the width of said container at a plurality of points along the height of said container.

21. The apparatus of claim 18 wherein said first and second measurement means each includes an LVDT located at said first and second reference point.

* * * * *